Patented May 16, 1933

1,909,630

UNITED STATES PATENT OFFICE

JOHN HERBERT GEOFFREY PLANT, OF SPONDON, NEAR DERBY, ENGLAND, ASSIGNOR TO CELANESE CORPORATION OF AMERICA, A CORPORATION OF DELAWARE

CATALYTIC PROCESS FOR THE PRODUCTION OF ALIPHATIC ACIDS AND THEIR ESTERS

No Drawing. Application filed March 24, 1931, Serial No. 525,044, and in Great Britain August 20, 1930.

This invention relates to the manufacture of aliphatic acids either in the free state or in the form of their esters and especially to the manufacture of acetic acid and/or methyl acetate.

In U. S. application S. No. 138,116 filed 27th September, 1926 now Patent No. 1,864,643 there is described a process for the manufacture of acetic acid either in the free state or in the form of its methyl ester, by subjecting methanol (and/or substances or mixtures of substances capable of generating methanol) in the presence or absence of water to the action of carbon monoxide in the presence of certain acid catalysts, namely consisting of or comprising an inorganic acid or an inorganic acid containing an organic group, the said acids being present as such or in the form of acid salts. As instances of the acid catalysts, the said patent mentions inter alia phosphoric acid and acid phosphates.

Further the said patent describes how the process can be extended to the higher alcohols (for example ethyl alcohol) or their derivatives, such as ethers and esters, for the production of the corresponding higher acids, (for instance propionic acid) or their esters.

I have found that it is very advantageous to control or maintain the degree of hydration of the phosphoric acids or acid phosphates during the reaction and that such control or maintenance can be effected in a particularly satisfactory manner by treating the catalyst with liquid water.

In performing the invention I may subject the gaseous mixture of methanol or other aliphatic alcohol (or substances capable of generating the aliphatic alcohol) and carbon monoxide—hereinafter referred to as the reaction gases or vapors—to the action of the phosphoric acid or acid phosphates in any convenient manner. Preferably reaction gases or vapors are subjected to the reaction under high temperatures (for example between 200° and 450° C., and preferably between 280° and 400° C.) and elevated pressure (for example 50 to 200 atmospheres or more). Preferably I employ reaction gases or vapors containing water vapor.

For the purpose of the invention the phosphoric acids or acid phosphates can be treated in any convenient or desired manner with liquid water, whether continuously or intermittently with the operation of the catalytic process.

Thus, for example, the catalyst may be periodically or continuously removed from the reaction chamber, treated with liquid water and returned to the reaction chamber. This method is especially convenient in cases where the reaction gases are passed in counter-current to a stream of liquid catalyst, or where the catalyst is passed as stream or film through a reaction zone in the same direction or in counter-current to the reaction gases. Or, for example, the catalyst may be caused to circulate between the reaction zone and a cooler part of the apparatus where it may be treated with liquid water.

Or, for instance, the treatment of the catalyst may be effected by periodically condensing water on to the catalyst from reaction gases or vapors containing water vapor. This may be done, for example, by periodically cooling the reaction zone and/or increasing the pressure, or for example by decreasing velocity of flow of the reaction gases whilst supplying sufficient water vapor to said gases to supersaturate them with water under the conditions of temperature and pressure obtaining in the reaction zone.

If desired the hydration of the catalyst may be controlled or maintained by combination of two or more of the above methods or by any other convenient method of treating the catalyst with liquid water. Thus for example the reaction zone may be cooled and at the same time the velocity of flow of the reaction gases diminished, thus obtaining a more marked condensation of water from reaction gases containing water vapor than with the individual steps. Or, for instance, when the catalyst is circulated between the reaction zone and a cooler part of the apparatus (or is being removed from the apparatus) where it is treated with water, the reaction zone may be periodically cooled and/or the velocity of flow of the reaction gases diminished.

By means of the invention the hydration of the phosphoric acids or acid phosphates can readily be controlled or maintained in any desired degree, for instance as ortho acids or salts, pyro acids or salts, or mixtures of ortho acids or salts with pyro acids or salts.

The catalyst to be employed for the purposes of the invention may, and preferably does contain promoters, such for instance as copper or copper compounds. The phosphoric acids or acid phosphates may be present in the catalysts in any form, such for example as solid, liquid, or supported upon carriers, the exact mode of performing the invention of course varying with the physical properties and state of the catalyst.

The following example serves to illustrate a convenient form of execution of the invention, but it is to be understood that the invention is in no way limited thereto.

*Example*

A mixture of carbon monoxide, water vapor and methyl alcohol vapor, in about the proportions 60 to 65 volumes of carbon monoxide to 1½ to 2 volumes of water vapor to 1 volume of methyl alcohol vapor, is supplied under a pressure of about 190 to 210 atmospheres to a reaction vessel heated to 300–320° C. and containing as catalyst ortho phosphoric acid containing about .5% of copper or copper compounds e. g. copper oxide, formate or phosphate.

The hydration of the catalyst is controlled or maintained by condensing water on to the catalyst by either of the following methods:—

(*a*) The reaction zone is cooled to about 100° C. for about 2 minutes every 24 hours or for about 4 minutes every 48 hours or for about 14 minutes every 7 days, the rates of supply of the carbon monoxide, water vapor and methyl alcohol vapor being maintained at the same values as during the reaction.

(*b*) The reaction zone is cooled to about 200° C. whilst the rate of supply of water vapor is increased to twice the rate of supply during the catalytic operation and the rate of supply or both carbon monoxide and methyl alcohol is reduced to half. This process is performed for about 1½ minutes daily or for proportionately longer periods if the hydration process is carried out less frequently.

Whilst performing either of the hydration processes (*a*) or (*b*) the pressure is maintained at substantially the same value as during the catalytic operation.

By each of these methods the catalyst is restored substantially to its initial degree of hydration by the condensation of the water in the manner described.

Preferably the condensation of the water on to the catalyst is performed at fairly short intervals e. g. each one or two days in order that the degree of hydration of the catalyst may be kept at a fairly uniform value.

In the claims the term "alcohol" means not only an alcohol but also substances or mixtures of substances capable of generating the alcohol, for example, an ether, e. g. dimethyl ether, or an ester, e. g. methyl formate or acetate and the term "acid phosphoric compound" includes phosphoric acids and acid phosphates.

What I claim and desire to secure by Letters Patent is:—

1. Process for the manufacture of at least one alkacyl compound which comprises subjecting a primary aliphatic alcohol to the action of carbon monoxide in the presence of at least one acid phosphoric compound and maintaining the degree of hydration of the acid phosphoric compound between desired limits during the reaction.

2. Process for the manufacture of at least one alkacyl compound which comprises subjecting a primary aliphatic alcohol to the action of carbon monoxide in the presence of at least one acid phosphoric compound and maintaining the degree of hydration of the acid phosphoric compound between desired limits during the reaction by treatment with liquid water.

3. Process for the manufacture of at least one alkacyl compound which comprises subjecting a primary aliphatic alcohol to the action of carbon monoxide in the presence of at least one acid phosphoric compound and maintaining the degree of hydration of the acid phosphoric compound between desired limits during the reaction by treatment with liquid water produced by condensation from the reaction vapors.

4. Process for the manufacture of at least one alkacyl compound which comprises subjecting methyl alcohol to the action of carbon monoxide in the presence of at least one acid phosphoric compound and maintaining the degree of hydration of the acid phosphoric compound between desired limits during the reaction.

5. Process for the manufacture of at least one alkacyl compound which comprises subjecting methyl alcohol to the action of carbon monoxide in the presence of at least one acid phosphoric compound and maintaining the degree of hydration of the acid phosphoric compound between desired limits during the reaction by treatment with liquid water.

6. Process for the manufacture of at least one alkacyl compound which comprises subjecting methyl alcohol to the action of carbon monoxide in the presence of at least one acid phosphoric compound and maintaining the degree of hydration of the acid phosphoric compound between desired limits during the reaction by removing the same from the reaction zone, treating with liquid water and returning to the reaction zone.

7. Process for the manufacture of at least one alkacyl compound which comprises subjecting methyl alcohol to the action of carbon monoxide in the presence of at least one acid phosphoric compound and maintaining the degree of hydration of the acid phosphoric compound between desired limits during the reaction by treatment with liquid water produced by condensation from the reaction vapors.

8. Process for the manufacture of at least one alkacyl compound which comprises subjecting methyl alcohol to the action of carbon monoxide at temperatures of between about 200 and 450° C. in the presence of at least one acid phosphoric compound and maintaining the degree of hydration of the acid phosphoric compound between desired limits during the reaction by treatment with liquid water.

9. Process for the manufacture of at least one alkacyl compound which comprises subjecting methyl alcohol to the action of carbon monoxide at temperatures of between about 200° and 450° C. and under pressures of between about 50 and 300 atmospheres in the presence of at least one acid phosphoric compound and maintaining the degree of hydration of the acid phosphoric compound between desired limits during the reaction by treatment with liquid water.

10. Process for the manufacture of at least one alkacyl compound which comprises subjecting a primary aliphatic alcohol to the action of carbon monoxide in the presence of at least one acid phosphoric compound and maintaining the degree of hydration of the acid phosphoric compound substantially uniform during the reaction by treatment with liquid water.

11. Process for the manufacture of at least one alkacyl compound which comprises subjecting methyl alcohol to the action of carbon monoxide in the presence of at least one acid phosphoric compound and maintaining the degree of hydration of the acid phosphoric compound substantially uniform during the reaction by treatment with liquid water.

12. Process for the manufacture of at least one alkacyl compound which comprises subjecting methyl alcohol to the action of carbon monoxide in the presence of ortho phosphoric acid and maintaining the degree of hydration of the phosphoric acid between desired limits during the reaction by treatment with liquid water.

13. Process for the manufacture of at least one alkacyl compound which comprises subjecting methyl alcohol to the action of carbon monoxide in the presence of ortho phosphoric acid and maintaining the degree of hydration of the phosphoric acid between desired limits during the reaction by treatment with liquid water produced by condensation from the reaction vapors.

14. Process for the production of at least one alkacyl compound which comprises subjecting methyl alcohol to the action of carbon monoxide, at temperatures of between about 200° and 450° C. and under pressures of between about 50 and 300 atmospheres, in the presence of ortho phosphoric acid and maintaining the degree of hydration of the ortho phosphoric acid substantially uniform by periodically condensing liquid water upon it from the reaction vapors.

In testimony whereof I have hereunto subscribed my name.

JOHN HERBERT GEOFFREY PLANT.